US012601653B2

(12) United States Patent
Al Jabri

(10) Patent No.: US 12,601,653 B2
(45) Date of Patent: Apr. 14, 2026

(54) ASSEMBLY POINT SYSTEM WITH ACTIVE AIR QUALITY AND INDUSTRIAL GAS EMISSIONS MONITORING

(71) Applicant: SAUDI ARABIAN OIL COMPANY, Dhahran (SA)

(72) Inventor: Khalid Rasheed Al Jabri, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 289 days.

(21) Appl. No.: 18/487,779

(22) Filed: Oct. 16, 2023

(65) Prior Publication Data

US 2025/0123173 A1 Apr. 17, 2025

(51) Int. Cl.
*G01M 3/04* (2006.01)
*G08B 19/00* (2006.01)
(52) U.S. Cl.
CPC .............. *G01M 3/04* (2013.01); *G08B 19/00* (2013.01)
(58) Field of Classification Search
CPC ......... G01M 3/04; G08B 19/00; G08B 7/066; G08B 21/02; G08B 21/12; G08B 21/16; G08B 21/14
See application file for complete search history.

(56) References Cited

U.S. PATENT DOCUMENTS 6,198,410 B1 * 3/2001 White ........................ G09F 9/33
340/919
10,311,705 B1 * 6/2019 Aljuaid .............. G05B 19/0428
2020/0273313 A1 * 8/2020 Stinson .................. G08B 21/14
2022/0108596 A1 4/2022 Stinson et al.
2022/0335812 A1 * 10/2022 Arora ................... G08B 27/001

FOREIGN PATENT DOCUMENTS

CN 108989744 A 12/2018
CN 109754508 A 5/2019
EP 4057248 A1 9/2022
IN 678/MUM/2011 A 7/2013
(Continued)

OTHER PUBLICATIONS

ISR-WO for PCT/US2024/050548 (which claims priority to the present application) and dated Jan. 21, 2025.
(Continued)

*Primary Examiner* — David Z Huang
(74) *Attorney, Agent, or Firm* — Vorys, Sater, Seymour and Pease LLP

(57) ABSTRACT

A facility safety method includes establishing, at distinct locations relative to the facility, one or more smart assembly point systems (SAPS), detecting at each SAPS environmental parameters including wind speed, wind direction, ambient temperate and gas of interest presence, determining if a hazardous condition exists based on the detected parameters, alerting personnel of the hazardous condition, said alerting including providing the location of a SAPS at a clean air assembly point, and conducting a personnel headcount at the SAPS at the clean air assembly point. In certain embodiments, a SAPS structure having four backlit sides with transparent lettering that are photocell-activated at night time or conditions of low visibility is used.

14 Claims, 5 Drawing Sheets

(56)         References Cited

FOREIGN PATENT DOCUMENTS

| KR | 101443834 | B1 | 9/2014 |
| KR | 20190063729 | A | 6/2019 |
| KR | 102554731 | B1 | 7/2023 |
| WO | 2015/057187 | A1 | 4/2015 |

OTHER PUBLICATIONS

Hernandez, Joshua et al., Improving Plant and Worker Safety, pp. 59-62 (2020); retrieved from http://publications.hydrocarbonengineering. com/flip/hydrocarbon-engineering/2020/July/hesm7.html#60.

* cited by examiner

102

Access Point

Flashing Beacon

Sensors

PV Panel

Signage

Emergency Assembly Point

QR Code

ASSEMBLY POINT SYSTEM WITH ACTIVE AIR QUALITY AND INDUSTRIAL GAS EMISSIONS MONITORING

FIELD OF THE DISCLOSURE

The present disclosure relates generally to industrial facility safety and, more particularly, to determining assembly points and headcounts during hazardous conditions events at industrial facilities.

BACKGROUND OF THE DISCLOSURE

Industrial facilities require continuous monitoring for any potential hazards that may impact the environment, personnel, and assets in order to ensure safety of operation. Also, facilities need to ensure conducting the emergency response plan in a safe and timely evacuation manner during any incident to ensure no impact on personnel.

Some types of hazards that may be encountered are gas leaks, whereby escaping material may be toxic or flammable or otherwise pose grave danger to human health, and avoidance through immediate evacuation is paramount. The leaking material may not be static, and may take the form of an expanding, traveling cloud of gas that may affect or dynamically change the safest location at which personnel should assemble to get out of harm's way. Therefore it is important to dynamically determine the safest assembly point location during hazardous conditions and to guide personnel thereto, and to be able to conduct headcounts electronically of personnel to ascertain that they are out of harm's way.

Wind direction and speed are other important factors for industrial facilities. During toxic gas leaking or excess wind storms, collecting wind direction and wind speed measurements by the plant emergency response team are crucially important for commencing an industrial evacuation process, wherein based on the collected wind speed and direction measurements from the field, the incident response team can immediately be very certain on deciding to guide the evacuated personal to the safest assembly area inside the plant, and the thus the gathered personal will remain gathered out of the way of released toxic gas or exposed to high wind speed, and will be properly sheltered.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a facility safety method includes establishing, at distinct locations relative to the facility, one or more smart assembly point systems (SAPS), detecting at each SAPS environmental parameters including wind speed, wind direction, ambient temperate and gas of interest presence, determining if a hazardous condition exists based on the detected parameters, alerting personnel of the hazardous condition, said alerting including providing the location of a SAPS at a clean air assembly point, and conducting a personnel headcount at the SAPS at the clean air assembly point.

In a further embodiment, a smart assembly point systems (SAPS) includes an outdoor-hardened structure having, a sensor platform for detecting environmental parameters including wind speed, wind direction, ambient temperate and gas of interest presence, a signaling system for signaling personnel based on the detected environmental parameters, a power supply for autonomously powering the SAPS, a headcount platform operable to track personnel at the SAPS, and a communication module for wirelessly delivering the environmental parameters and a headcount indication to a remote server.

The accurate and fast headcounting methods for any emergency evacuation play key role in the success of facilities emergency response plan. This is clearly observed during how fast the facility rescue team can identify the names and locations of victims immediately after the emergency evacuation for the affected plant. This is achieved by the subject disclosed technology via enabling the gathered personal at assembly area to access to the system headcount reporting website and allow them to report their identities (i.e. names, Badge numbers, Organizations' names). All these data provided by gathered personal are viewed immediately by the plant response team at plant's Emergency Control Center ECC which will be utilized for commencing the urgent rescue activities for victims and missing personal with least effort compared to current manual headcounting and rescue method which is not accurate in many times.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
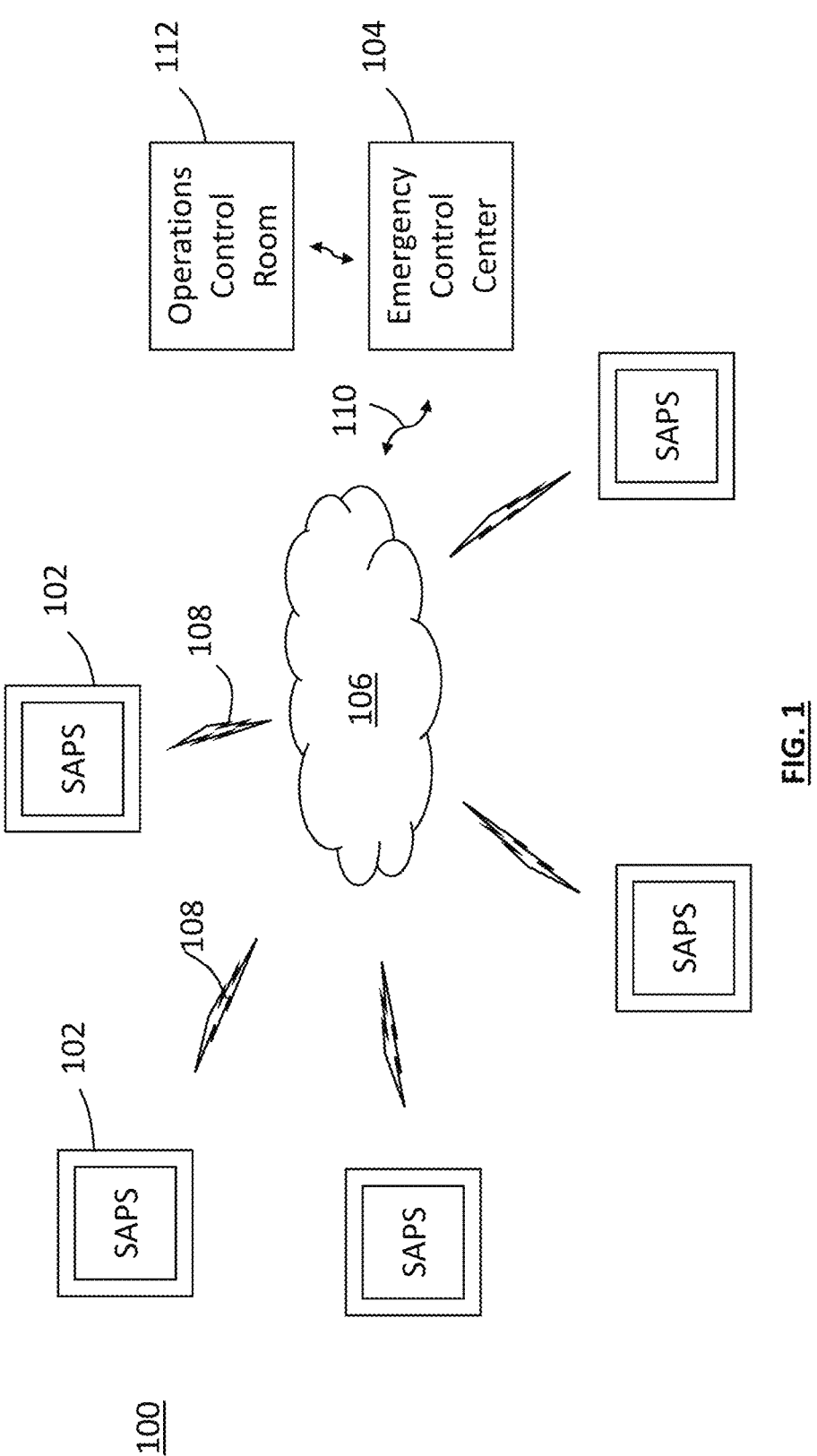
FIG. 1 is schematic diagram of a facilities safety management system 100 in accordance with certain embodiments.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to industrial facility safety and, more particularly, to determining assembly points and headcounts during hazardous conditions events at industrial facilities.

FIG. 1 is schematic diagram of a facilities safety management system 100 in accordance with certain embodiments. The system 100 can be installed in any industrial facility such as an oil refinery in which dangerous conditions can arise and personnel wellbeing must be safeguarded. The dangerous conditions can for example be attributed to inadvertent leaks of toxic and/or flammable gases that can be exacerbated by weather conditions such as high winds and/or wind direction shifts. The leak sources can be from the facility itself, or from neighboring facilities, but nevertheless must be detected and addressed with adequate remediations to protect personnel and property.

Figure 1A:
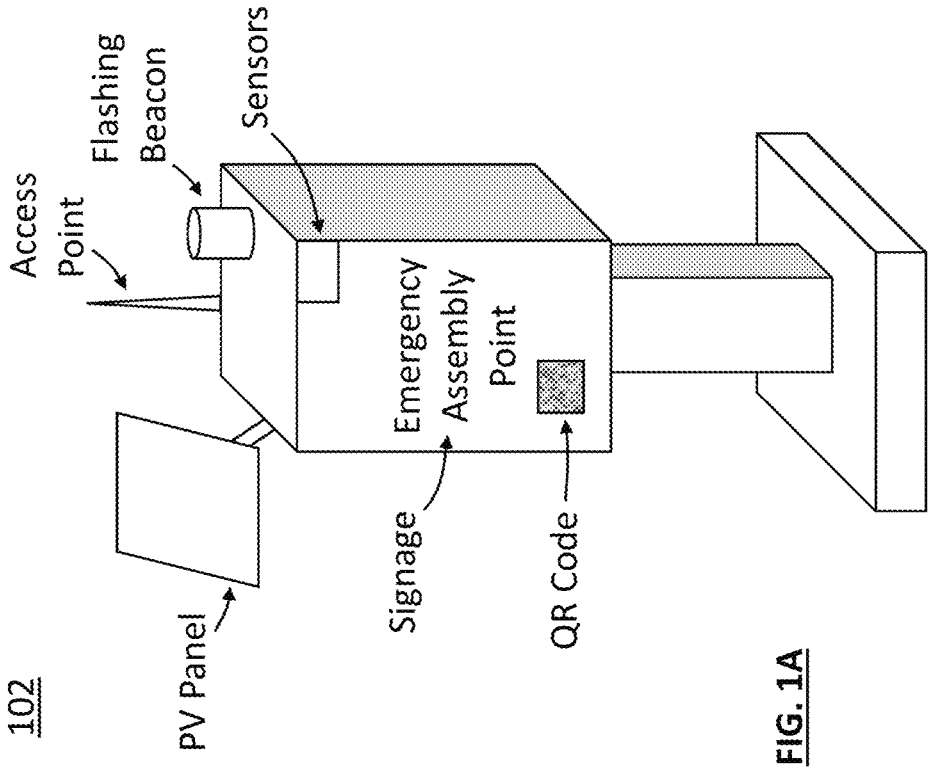
FIG. 1A is an isometric view of a SAPS in accordance with certain embodiments.

System 100 includes one or more smart assembly point systems (SAPS) 102 distributed at various locations at the facility. The SAPS 102 can be stand-alone outdoor-hardened structures (e.g., stainless steel), shown in more detail in FIG. 1A, that are self-powered, through solar PV (photovoltaic) panel or wind generators for instance, and that provide plant personnel with appropriate visibility by detecting lighted cubical signage from all four sides (e.g., "EMERGENCY ASSEMBLY POINT"), sirens, light beacons, etc., as well as access to plant intranet/internet, for example through network-connected access points, as detailed below, in order to facilitate assembly at designated locations out of harm's way and at accountable locations. The structure sides of the SAPS 102 can for example be glass or plastic which is transparent at the location of the lettering and backlit by a pair of photocell-controlled light sources that are activated at night or during heavy smoke or other poor visibility conditions so that the lettering (e.g. "EMERGENCY ASSEMBLY POINT") becomes starkly visible. No external cabling is required because the connections are wireless and power is generated locally, through the PV panel and/or wind generators or the like.

As seen in FIG. 1, the SAPS 102 are in communication with an emergency control center 104 by way of a network 106, which may include a facility internet/intranet. Preferably, each of the SAPS 102 communicates wirelessly with the network 106, as indicated by wireless communication channels 108, which may take the form of cellular or WiFi regimes for instance. Emergency control center 104 may be in communication with network 106 and SAPS 102 via communication channel 110, which may be wired or wireless, or a combination of these. Emergency control center 104 may also similarly be in communication with an operations control room 112 of the facility, to integrate the functionality and control of the facility and its emergency response and preparedness.

Figure 2:
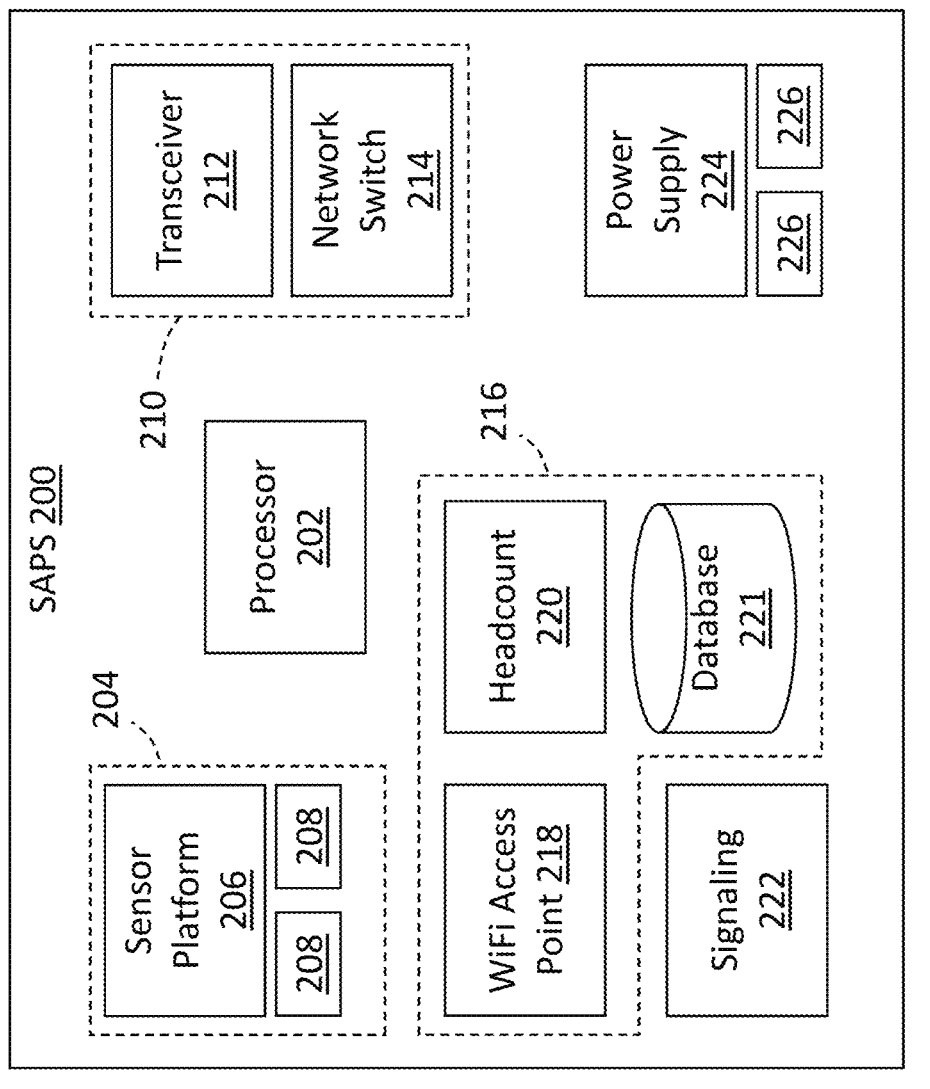
FIG. 2 is a block diagram showing some details of a SAPS in accordance with certain embodiments.

FIG. 2 is a block diagram showing some details of a SAPS 200, which may be the same as SAPS 102 of FIG. 1. A processor 202, which may be a Raspberry PI computer board in communication with an Arduino Mega 2560 for example, is operable to manage some or all of the functions of the SAPS 200 and/or components thereof. The processor 202 is coupled to a sensor module 204 comprising a sensor platform 206 operable to receive local environmental parameters, such as wind speed, wind direction, ambient temperate and gas of interest presence at the location of the SAPS 200, and potentially non-local environmental parameters—for example from other SAPS 200. The local environmental parameters are collected by appropriate sensors 208 that are operable to determine wind speed and direction for instance, as well as temperature and humidity, the presence of various gases of interest, such as CO, NH3, and H2S, LEL, and other parameters that may be of value in determining whether a hazardous situation is developing and needs to be addressed, for example through evacuation and/or gathering of personnel at a safe location such as a designated one or more of the SAPS 200 at which conditions have been determined to be hospitable (i.e, the air is clean and free of leaked gases and LEL). Collection of parameter information by the sensors 208 may be continuous or periodic or event-driven for instance, and different sensors may operate at different schedules.

SAPS 200 also includes a communication module 210, comprising a wireless transceiver 212 such as an LTE device for wirelessly coupling the SAPS 200 to the network 106 (FIG. 1) to enable the transmission of the environmental parameters and other information to the emergency control center 104 (FIG. 1). This can be effected using a network packet protocol, and a network switch 214 can be provided for this purpose. In certain embodiments, the SAPS 200 provides continuous 24/7 readings from system racked up sensors 208 (Temperature, Hydrogen sulfide H2S, Lower Explosive Limit LEL, Wind Speed, and Wind Direction). All sensors' abnormal readings can be logged in SAPS environment events logger (not shown) and can be browsed through a system website, for example hosted at emergency control center 104 or operations control room 112. Any sensor abnormal reading can be logged in the system events logger can will be referenced with the following details:

Date and Time

Severity level: Moderate, High, Normalized (low)

Sensor value

Wind Speed and Direction during high gas emissions or high wind speed.

In certain embodiments, SAPS sensor readings are collected continuously 24/7 by platform 204 unit (e.g., Raspberry PI) and those abnormal sensors readings will be registered in the platform and can be retrieved via system website for facilities safety advisor/investigators at any time whenever required either to optimize the safety conditions inside the industrial facility, or during crises investigations to identify the incident's root causes. These sensors' reading which had been automatically registered are namely the industrial gases, such as H2S, LEL, CO, NH3, etc., sensors, temperature sensor, and wind speed and direction sensor.

Conversely, clean air conditions at SAPS 200 can be tracked so that personnel can be instructed to aggregate at safe SAPS in emergency situations. Logged data above can be essential details for any plant safety advisor to debug plant safety and weather issues and provide corrective actions accordingly. In addition, in subsequent reviews, whenever any gas leaking safety issues arise, the SAPS environment event logger can be an official tool to debug such safety issues and report them accordingly to plant management for deciding the corrective action in an expedient manner.

SAPS 200 also includes a personnel tracking module 216, comprising a WiFi access point 218 and a headcount platform 220. In certain embodiments, personnel who approach a SAPS 200 are able to be counted for safety purposes. For example, they are connected to the plant intranet/internet by the access point 218 when they come into its range to thereby join the plant network domain. They can then scan a QR code displayed at the SAPS 200, using a smart phone or tablet for example, to thereby report themselves as present at that particular SAPS at that point in time. Headcount platform 220 is operable to track this information and relay it to the emergency control center 104, by way of communication module 210. In certain embodiments, a headcount database 221 at the SAPS 200 and/or at the control center 104 or a combination of these, can track counted personnel, and the headcount module 220 or the like at the data control center can query the database to determine missing personnel. The headcount information, as well as the environmental parameters at that specific SAPS 200, and at other SAPS, can be displayed in real time on a system supervision website so that the personnel and emergency operators can view it and take appropriate safety measures with knowledge of which personnel have assembled at which SAPS 200 for example. In certain embodiments additional safety measures can include transmission of alerts to plant radio terminals carried by personnel, or by way of emails send to personnel smart phones or tablets, apprising them of dangerous conditions such as shifts in wind speed/direction, presence of dangerous gases, instructions to follow to get out of harm's way, evacuation routes for example to clean air SAPS, and so on. In certain embodiments, alerts/emails can be automatically sent out whenever detecting high speed winds, as well as, gas levels (e.g., H2S & LEL) exceed their normal levels to moderate or high levels and vice versa. The alerting messages can be sent every time that the system determines the wind speed, temperatures, and gas leaking levels are changing from normal to moderate, moderate to high, and vice versa. Alerting messages can include latest readings from the system sensors which cover for example wind speed, wind direction, ambient temperature, H2S gas level, and LEL gas level.

As mentioned above, SAPS 200 is equipped with a signaling system 222 comprising various beacons and signaling devices to increase visibility and enhance its functionality as a gathering point in case of emergencies, which may be determined by emergency control center 104 based on the environmental parameters send by that SAPS 200, and in some embodiments, in conjunction with environmental parameters sent by other SAPS devices in the facility. The signaling devices can include flashing lights of different colors, as well as sirens and horns, pre-recorded announcements, and the like, and these are preferably sufficiently audible and/or visible in daylight and at night, even during severe weather and other cataclysmic events such as fires with intense smoke, explosions, sand storms, power outages, and so on. In certain embodiments, triggering one or more of these signals may be local, by the SAPS 200 itself, without resort to commands from emergency control center 104. Triggering may be based on detection of threshold amounts of leaked gases of interest, LEL, changes (increases or decreases) in wind speed or direction, and so on, as determined by processor 202 in some instances, and/or automatically by emergency control center 104 and/or human operators thereat.

Power to SAPS 200 and various components thereof may be provided through a power supply 224, which can include one or more autonomous green energy sources 226, which can be for example a photovoltaic (PV) panel, a wind turbine, or the like, as well as batteries (not shown) for storage of such power. In this manner SAPS 200 may be self-contained and do not require power cabling connections, but can be installed anywhere in a facility at which power can be generated (i.e., a sunny location for PV cell operation, etc.). Such operation promotes SAPS is well-suited for installation at new areas not served with power and data wired connections as well as at temporary facilities known to be of high risk, such as oil drilling workover, pipelines constructions or maintenance.

It is also possible that the one or more of the SAPS 200 are vehicle-mounted and obtain their power from the vehicle battery. Such mobile SAPS units can provide versatility for quick and/or temporary installation and operation, and can be deployed on plant operation or industrial security patrolling vehicles. This is considered extremely useful for guiding personnel evacuation to unplanned safe locations in case existing assigned assembly areas become dangerous and inhospitable, for example from high levels from H2S and LEL gas emissions.

Figure 3:
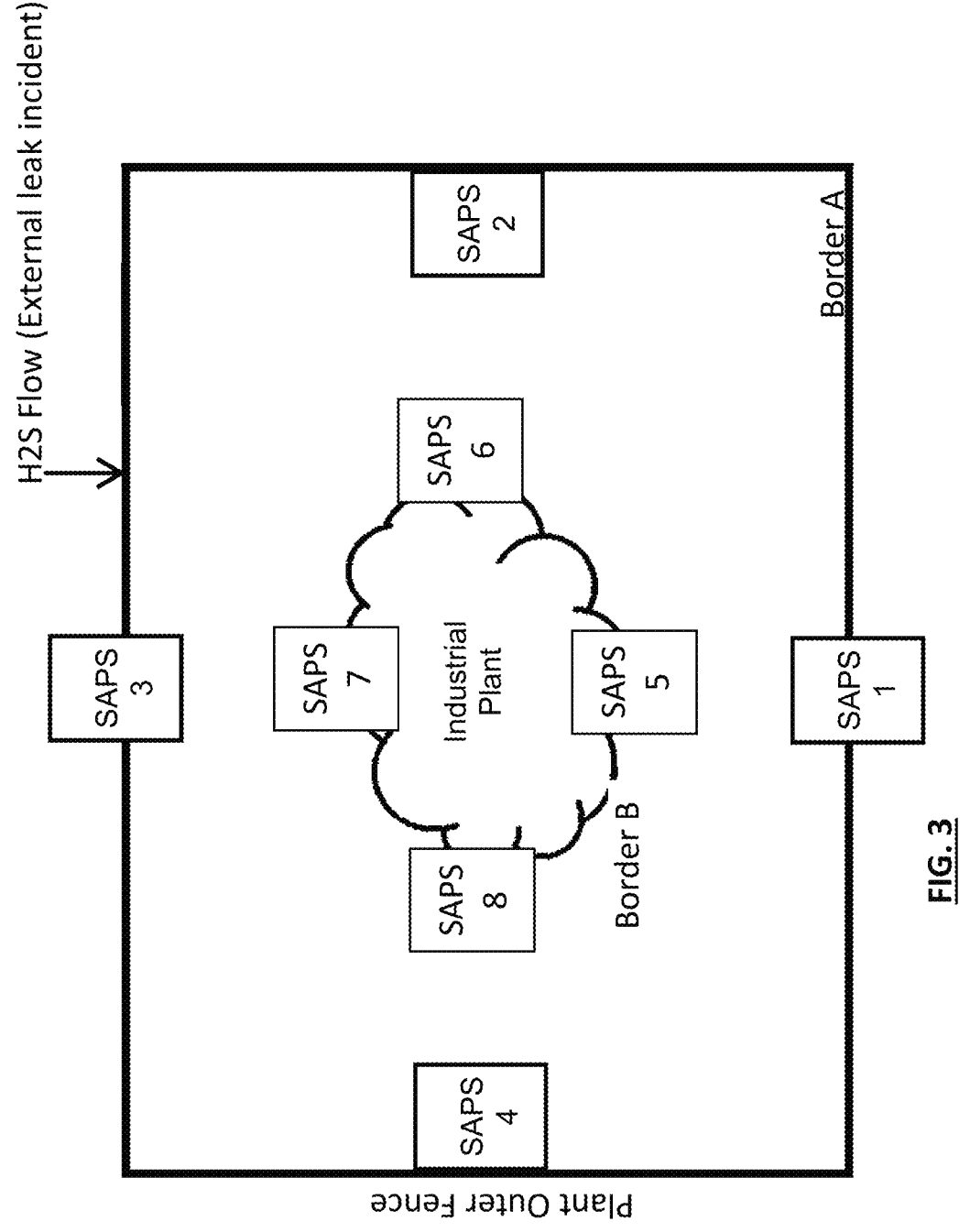
FIG. 3 is a diagram of an arrangement of SAPS grouped into first and second sets for improved locating of hazardous conditions.

In certain embodiments, an arrangement of the SAPS 200 can be deployed that can enable better location tracking of hazardous conditions particularly in large industrial cities with multiple plant facilities that could source a gas leak for instance. With reference to FIG. 3, such an arrangement can include a first, perimeter ("Border A") set of SAPS 1-4 installed at the border fence of an industrial plant; and a second, interior ("Border B") set of SAPS 5-8 installed within the industrial plant itself. All SAPS 200 in both sets are ready to detect and report any abnormality in H2S and LEL emissions and report them to the operators emergency control center 104 continuously. The main purpose of providing two SAPS sets is for ascertaining the H2S and LEL gas flow direction to be either released from inside the industrial plant or leaked by one of adjacent (neighboring) plants (not shown). Among the eight distributed SAPSs 200 in FIG. 3, plant operators can access the website of each SAPS unit individually and browse the active monitoring record for the gas emissions at a selected SAPS area and can pull all required details such as gas type, detection date and time, detected gas %, wind direction and wind speed. If the H2S or LEL gases had been detected first or only (either one) by any of SAPS units at Border B, that means the gas release is from inside the plant, while if detected from Border A for or only (either one), then the gas leak is from outside plant. Furthermore, based on gas leak wind direction and wind speed, a price determination of the leak direction and identify of the area that will be affected out of the released H2S or LEL gases can be made.

Figure 4:
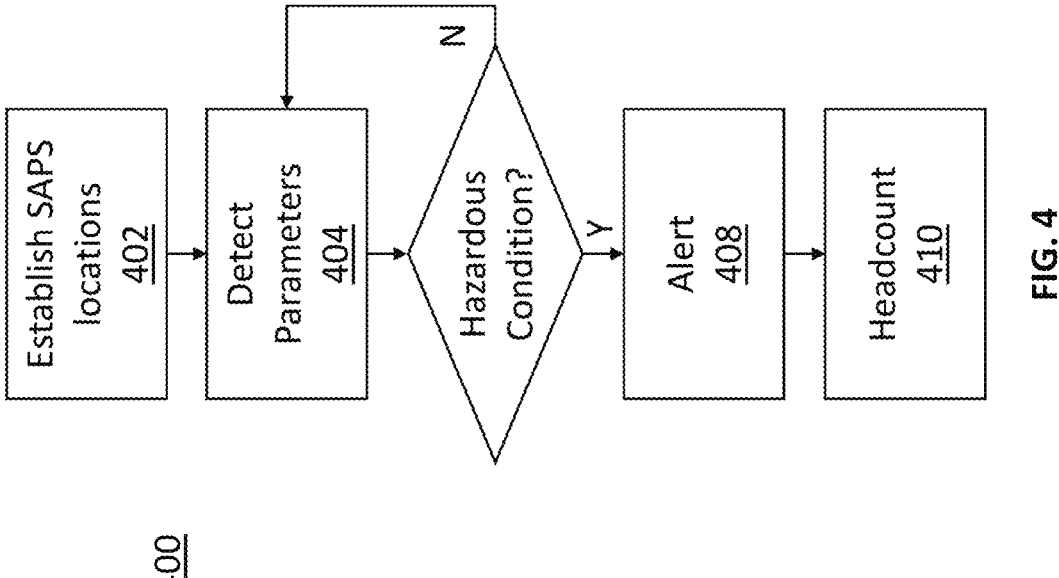
FIG. 4 is flow diagram of a method for conducting facility safety in accordance with certain embodiments.

In view of the structural and functional features described above, example methods will be better appreciated with reference to FIG. 4. While, for purposes of simplicity of explanation, the example method of FIG. 4 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods, and conversely, some actions may be performed that are omitted from the description.

FIG. 4 is an example of a method 400 for conducting facility safety. The method 400 can be implemented by SAPS 102/200, as shown in FIGS. 1-3 above. Thus, reference can be made to the example of FIGS. 1-3 in the example of FIG. 4. At 402, one or more smart assembly point systems (SAPS) 200 are established at a facility. At 404, at each SAPS, environmental parameters such as wind speed, wind direction, ambient temperate and gas of interest presence are detected. At 406, a determination of hazardous condition existence is made. At 408, personnel are alerted if the hazardous conditions exist. The alerting can include indicating the location of a SAPS at a clean air assembly point so that personnel can safely assemble there. At 410, a personnel headcount is conducted, at the clean air assembly point SAPS and/or other SAPS.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware. Furthermore, portions of the embodiments may be a computer program product on a computer-readable storage medium having computer readable program code on the medium. Any non-transitory, tangible storage media possessing structure may be utilized including, but not limited to, static and dynamic storage devices, volatile and non-volatile memories, hard disks, optical storage devices, and magnetic storage devices, but excludes any medium that is not eligible for patent protection under 35 U.S.C. § 101 (such as a propagating electrical or electromagnetic signals per se). As an example and not by way of limitation, computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, as appropriate.

Certain embodiments have also been described herein with reference to block illustrations of methods, systems, and computer program products. It will be understood that blocks and/or combinations of blocks in the illustrations, as well as methods or steps or acts or processes described herein, can be implemented by a computer program comprising a routine of set instructions stored in a machine-readable storage medium as described herein. These instructions may be provided to one or more processors of a general purpose computer, special purpose computer, or other programmable data processing apparatus (or a combination of devices and circuits) to produce a machine, such that the instructions of the machine, when executed by the processor, implement the functions specified in the block or blocks, or in the acts, steps, methods and processes described herein.

These processor-executable instructions may also be stored in computer-readable memory that can direct a computer or other programmable data processing apparatus to function in a particular manner, such that the instructions stored in the computer-readable memory result in an article of manufacture including instructions which implement the function specified. The computer program instructions may also be loaded onto a computer or other programmable data processing apparatus to cause a series of operational steps to be performed on the computer or other programmable apparatus to realize a computer implemented process such that the instructions which execute on the computer or other programmable apparatus provide steps for implementing the functions specified in flowchart blocks that may be described herein.

Embodiments disclosed herein include:

A. A facility safety method that includes establishing, at distinct locations relative to the facility, one or more smart assembly point systems (SAPS), detecting at each SAPS environmental parameters including wind speed, wind direction, ambient temperate and gas of interest presence, determining if a hazardous condition exists based on the detected parameters, alerting personnel of the hazardous condition, said alerting including providing the location of a SAPS at a clean air assembly point, and conducting a personnel headcount at the SAPS at the clean air assembly point.

B. A smart assembly point systems (SAPS) that includes an outdoor-hardened structure having, a sensor platform for detecting environmental parameters including wind speed, wind direction, ambient temperate and gas of interest presence, a signaling system for signaling personnel based on the detected environmental parameters, a power supply for autonomously powering the SAPS, a headcount platform operable to track personnel at the SAPS, and a communication module for wirelessly delivering the environmental parameters and a headcount indication to a remote server.

Each of embodiments A through B may have one or more of the following additional elements in any combination: Element 1: the SAPS include at least one stationary SAPS having an autonomous power supply. Element 2: the autonomous power supply is a photovoltaic panel. Element 3: the autonomous power supply is a wind-driven generator. Element 4: the SAPS include at least one mobile vehicle-mounted device. Element 5: the distinct locations comprise a first, perimeter set SAPS and a second, interior set of SAPS. Element 6: determining whether the hazardous condition originated at the facility based on whether the hazardous condition was detected at the first or second set of SAPS. Element 7: the gas of interest includes one or more of LEL (lower explosive limit), CO, NH3, and H2S. Element 8: the structure comprises backlit sides with transparent lettering that are photocell activated at night time or conditions of low visibility By way of non-limiting example, exemplary combinations applicable to A through B include: Element 1 with Element 4; Element 1 with Element 5; Element 1 with Element 6; Element 1 with Element 7; Element 2 with Element 4; Element 2 with Element 5; Element 2 with Element 6; Element 2 with Element 7; Element 3 with Element 4; Element 3 with Element 5; Element 3 with Element 6; Element 3 with Element 7; Element 4 with Element 5; Element 4 with Element 6; Element 4 with Element 7; Element 5 with Element 6; Element 5 with Element 7; and Element 6 with Element 7; Element 2 with Element 8; Element 3 with Element 8; Element 4 with Element 8; Element 5 with Element 8; Element 6 with Element 8; Element 7 with Element 8;

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A facility safety method comprising:
establishing, at distinct locations relative to the facility, a plurality of smart assembly point systems (SAPS), including a first, perimeter set of SAPS and a second, interior set of SAPS;
detecting at each SAPS environmental parameters including wind speed, wind direction, ambient temperature and gas of interest presence;
determining if a hazardous condition exists based on the detected parameters;
alerting personnel of the hazardous condition, said alerting including providing the location of a SAPS at a clean air assembly point;
conducting a personnel headcount at the SAPS at the clean air assembly point; and
determining whether the hazardous condition originated at the facility based on whether the hazardous condition was detected at the first or second set of SAPS.

2. The method of claim 1, wherein the SAPS include at least one stationary SAPS having an autonomous power supply.

3. The method of claim 2, wherein the autonomous power supply is a photovoltaic panel.

4. The method of claim 2, wherein the autonomous power supply is a wind-driven generator.

5. The method of claim 1, wherein the SAPS include at least one mobile vehicle-mounted device.

6. The method of claim 1, wherein the gas of interest includes one or more of CO, NH3, and H2S.

7. A smart assembly point system (SAPS) for installation at a facility, comprising:
an outdoor-hardened structure having:
a sensor platform for detecting environmental parameters including wind speed, wind direction, ambient temperature and gas of interest presence,
a signaling system for signaling personnel based on the detected environmental parameters,
a power supply for autonomously powering the SAPS,
a headcount platform operable to track personnel at the SAPS, and
a communication module for wirelessly delivering the detected environmental parameters and a headcount indication to a remote server, wherein the remote server is configured to determine if a hazardous condition exists based on the detected environmental parameters and to determine whether the hazardous condition originated at the facility based on whether the SAPS is an interior or perimeter SAPS and whether other SAPS that delivered environmental parameters to the remote server are interior or perimeter SAPS.

8. The system of claim 7, wherein the power supply is a photovoltaic panel.

9. The system of claim 7, wherein the power supply is a wind-driven generator.

10. The system of claim 7, wherein the SAPS is a mobile vehicle-mounted device.

11. The system of claim 7, wherein the gas of interest includes one or more of, CO, NH3, and H2S.

12. The system of claim 7, further including an access point for wirelessly connecting to personnel devices in the vicinity of the SAPS.

13. The system of claim 12, wherein the SAPS includes a QR code that the personnel devices are configured to scan to effect a headcount of the personnel.

14. The system of claim 7, wherein the structure comprises backlit sides with transparent lettering that are photocell activated at night time or conditions of low visibility.

* * * * *